No. 736,381. PATENTED AUG. 18, 1903.
M. F. R. GLOGNER.
PROCESS OF PURIFYING GRAPHITE.
APPLICATION FILED JAN. 27, 1903.
NO MODEL.

No. 736,381. Patented August 18, 1903.

UNITED STATES PATENT OFFICE.

MORITZ FRIEDRICH REINHOLD GLOGNER, OF FREIBURG, GERMANY.

PROCESS OF PURIFYING GRAPHITE.

SPECIFICATION forming part of Letters Patent No. 736,381, dated August 18, 1903.

Application filed January 27, 1903. Serial No. 140,786. (No specimens.)

*To all whom it may concern:*

Be it known that I, MORITZ FRIEDRICH REINHOLD GLOGNER, a subject of the King of Prussia, German Emperor, residing at Freiburg, in the Kingdom of Prussia, German Empire, have invented certain new and useful Improvements in Processes of Purifying Graphite; and I do hereby declare that the following is a full, clear, and exact description.

The present invention relates to a process for purifying graphite from its natural mineral impurities, which process is especially adapted to be carried out on a manufacturing scale, because, on the one hand, it is very simple and cheap, and, on the other hand, the final result is very good and far superior to any obtainable by processes hitherto employed.

In my new process after being purified in a first wash from its heavier impurities—as, for instance, quartz, iron, and the like—by means of cold water the graphite mineral is mixed with about three or four times its weight of water to a thin paste. A quantity of petroleum is then added to this paste, which quantity is about half as much as the amount of pure graphite contained in the graphite mixture, and the whole is thoroughly stirred within a closed vessel. Afterward the vessel is allowed to stand, and water is sprinkled over the surface of the liquid by means of a rose or the like in order to obtain a quicker and more complete separation of the graphite particles from the earthy admixtures.

In my present invention I desire first to point out that the graphite mixture as submitted to the process of purification by means of water and petroleum consists, exclusively, of graphite and earthy admixtures. Only by this means is the quick and complete purification of the graphite by means of the subsequent treatment rendered possible. If the graphite were to be purified by means of water and petroleum while the heavier admixtures are still present, a far greater amount of petroleum, as well as of labor, would be necessary, yet a complete separation of the graphite from its admixtures would be impossible. The product obtained thus would not be pure. The high degree of purity, however, determines the value of the product.

For carrying out my new process preferably a plurality of agitating or shaking devices are arranged close to each other, one workman being sufficient for attending four of them.

Figure 1:
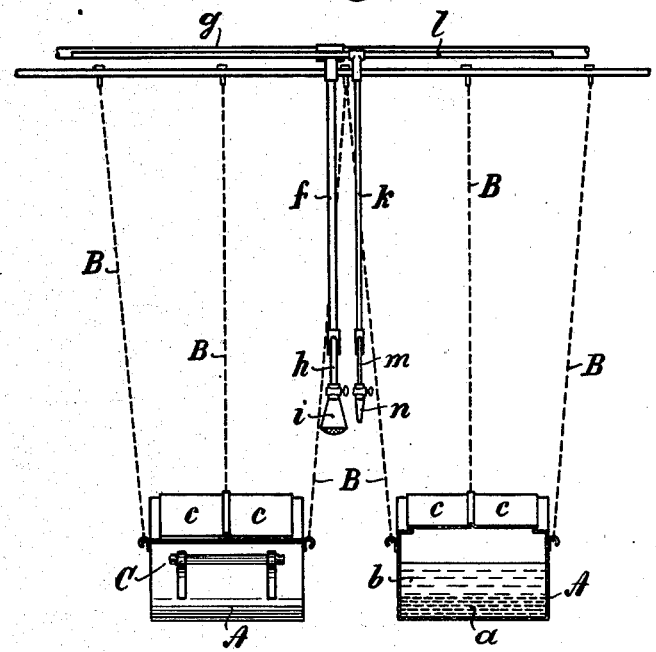
Figure 2:
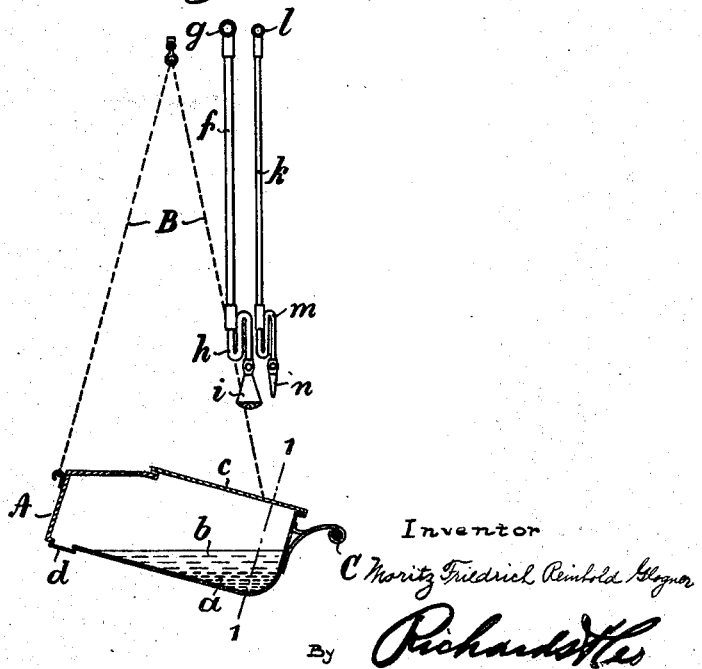

Figure 1 of the accompanying drawings illustrates two agitating devices arranged close to each other, one apparatus being shown in elevation and the other in a section on line 1 1 in Fig. 2. Fig. 2 represents a longitudinal section of an agitating apparatus.

Each agitator A is obliquely suspended on three chains B in such a manner that the wave formed when the vessel is agitated falls back on the higher part of the bottom and a thorough mixing of oil and graphite is obtained, the operation being at the same time facilitated. Each vessel A has a handle C.

$a$ is graphite filled in a wet state.

$b$ is the water with the layer of oil.

$c$ $c$ are covers.

$d$ is an outlet-hole for the pulpy residue—for instance, a hand-hole with a cover, a door, or the like. The tube $f$ is in connection with a water-supply $g$ and fitted with a flexible tube $h$ and a rose $i$. The tube $k$ is connected with an oil-supply $l$ and also fitted with a flexible tube $m$, leading to a mouthpiece $n$.

The devices are preferably operated by human force, because the treatment of the material is utterly difficult, and a throughout special treatment is required for each of the large number of varieties of the material.

Before the graphite is brought into the vessels A it is separated from its heavier admixtures—as quartz, iron, and the like—which in the well-known manner is effected by washing the material with water in long kennels. Exactly-weighted quantities of the material which thus contains only graphite and earthy admixtures are brought into the vessels A. Then, first water is admitted from the tube $h$ and later oil from the tube $m$.

The vessels A are agitated in short shocks, about thirty per minute. After the agitation has taken place the mixture of oil and graphite floating at the surface is subjected to a uniform action of the rose, whereafter the vessel is allowed to stand in order to obtain the separation of the earthy parts. After the attendant has operated four agitators in the described manner the dirty water in the first vessel has become clear in the meantime. The workman takes off the oil-graphite and puts it into a collector for the further treatment in order to obtain in any well-known manner a separation of the oil from the graphite.

The mixture containing only fine earthy substances and graphite is mixed with a quantity of water the weight of which is about three or four times as great as that of the graphite mixture. Petroleum is then added in the approximate proportion of one part petroleum to two parts of graphite contained in the mixture. Now the whole is given a strong rotating, rocking, or reciprocating movement within a closed vessel, so that the mixture is thoroughly stirred and intimately mingled. The petroleum is broken up into very fine drops or perles, and every graphite particle when touching them is attracted, while the earthy particles, which were already saturated with water before the addition of petroleum, remain completely neutral. After the vessel has been allowed to stand the earthy parts sink down, while the petroleum carrying the graphite tends to rise to the surface. After a certain time water is then sprinkled over the surface of the liquid by means of a rose or the like, whereby the fine earthy particles are caused to sink more quickly, and any earthy particles which may be carried upward by the rising petroleum and froth are caused to sink down again.

The vessel is shaken once, twice, or repeatedly after the graphite has been skimmed, and every time some petroleum is added. The whole of the graphite will then be taken off by the petroleum.

In the described manner the graphite is quickly, well, and cleanly separated from its earthy admixtures. The product obtained is of best quality and purity, yet the amount of petroleum and labor needed is insignificant. It is even rendered possible by my process to work graphite mixtures which only contain ten per cent. graphite and to obtain from them a product which is as valuable as the Ceylon graphite.

My new process is furthermore especially adapted for the purification of the small dense crystalline varieties of graphite, for which a commercial purifying process has not existed up to the present time.

Having now described my invention and in what manner the same is to be performed, what I claim, and desire to secure by Letters Patent, is—

A process for purifying graphite in a wet and cold manner by the use of water and petroleum, consisting in the following operations: purifying the graphite mineral from its heavy admixtures (as for instance quartz, iron and the like) by a washing with cold water; mixing said purified graphite mineral with about three or four times its weight of cold water; very strongly agitating said paste within a closed vessel after the addition of a quantity of petroleum of about half the weight of the pure graphite contained in the mixture; and then sprinkling water over the surface of the liquid, after the mixture has been allowed to stand, in order to obtain a quicker and more complete separation of the graphite particles from the earthy substances, substantially as described.

In witness whereof I have hereunto set my hand in presence of two witnesses.

MORITZ FREIDRICH REINHOLD GLOGNER.

Witnesses:
ERNST. KRATZ,
ALBERT SCHENK.